United States Patent
Skiba et al.

(10) Patent No.: US 10,069,973 B2
(45) Date of Patent: Sep. 4, 2018

(54) AGENT-INITIATED AUTOMATED CO-BROWSE

(71) Applicant: Avaya Inc., Santa Clara, CA (US)

(72) Inventors: David Skiba, Golden, CO (US);
Valentine C. Matula, Granville, OH (US); George Erhart, Loveland, CO (US)

(73) Assignee: Avaya Inc., Santa Clara, CA (US)

( * ) Notice: Subject to any disclaimer, the term of this patent is extended or adjusted under 35 U.S.C. 154(b) by 62 days.

(21) Appl. No.: 14/834,838

(22) Filed: Aug. 25, 2015

(65) Prior Publication Data
US 2017/0064079 A1 Mar. 2, 2017

(51) Int. Cl.
| H04M 3/00 | (2006.01) |
| H04M 3/51 | (2006.01) |
| H04M 7/00 | (2006.01) |
| H04M 3/22 | (2006.01) |
| G06Q 30/06 | (2012.01) |

(52) U.S. Cl.
CPC ...... *H04M 3/5191* (2013.01); *G06Q 30/0613* (2013.01); *H04M 3/2281* (2013.01); *H04M 7/0012* (2013.01)

(58) Field of Classification Search
CPC .................................................. H04M 3/5191
USPC ....... 379/265.01–265.14, 266.01–266.1, 309
See application file for complete search history.

(56) References Cited

U.S. PATENT DOCUMENTS

| 8,096,809 | B2 | 1/2012 | Burgin et al. |
| 8,634,543 | B2 | 1/2014 | Flockhart et al. |
| 8,738,384 | B1 * | 5/2014 | Bansal ..................... G10L 15/22 704/257 |
| 9,071,592 | B1 * | 6/2015 | Oakes, III ............. G06F 17/218 |
| 9,383,958 | B1 * | 7/2016 | Trahan ...................... G06F 3/14 |
| 9,588,943 | B2 * | 3/2017 | Bastide ............. G06F 17/30864 |
| 2003/0097448 | A1 * | 5/2003 | Menezes ................. H04L 29/06 709/227 |
| 2007/0150368 | A1 * | 6/2007 | Arora ..................... G06Q 30/02 705/26.1 |
| 2008/0052377 | A1 * | 2/2008 | Light ................... G06Q 10/107 709/218 |
| 2010/0037153 | A1 * | 2/2010 | Rogers .................. G06F 3/0481 715/758 |
| 2010/0235218 | A1 | 9/2010 | Erhart et al. |
| 2010/0296417 | A1 | 11/2010 | Steiner |

(Continued)

OTHER PUBLICATIONS

U.S. Appl. No. 14/670,830, filed Mar. 27, 2015, Matula et al.

*Primary Examiner* — William Deane, Jr.
(74) *Attorney, Agent, or Firm* — Sheridan Ross P.C.

(57) ABSTRACT

Co-browsing sessions provide a way for one party to see exactly what is being displayed on another party's computer or similar device. Co-browsing is particularly useful to an agent to help a customer solve a problem on a computer. Contact centers may determine portions of a co-browsing session that have been successful, capture the associated inputs, and have them play back to future customers. The agent may then be relieved from portions of the co-browsing interaction that are predictable and provide manual inputs having less predictability. The instructions for the automated co-browsing portions may be executed by the agent's device, the customer's device, and/or a server and may appear to the customer to be originating from the agent.

20 Claims, 5 Drawing Sheets

(56) References Cited

U.S. PATENT DOCUMENTS

| | | | |
|---|---|---|---|
| 2011/0125793 A1 | 5/2011 | Erhart et al. | |
| 2011/0125826 A1 | 5/2011 | Erhart et al. | |
| 2013/0212466 A1* | 8/2013 | Khalatian | G06Q 50/01 715/234 |
| 2014/0181208 A1* | 6/2014 | Robinson | G06F 17/30867 709/204 |
| 2015/0149916 A1* | 5/2015 | Mendez | G06F 17/30873 715/738 |
| 2015/0234468 A1* | 8/2015 | Hwang | G06F 3/017 345/156 |
| 2015/0310377 A1* | 10/2015 | Schlumberger | G06Q 30/016 705/7.15 |
| 2016/0062727 A1* | 3/2016 | Handrigan | G06F 17/30873 715/753 |
| 2016/0182721 A1* | 6/2016 | Khalatian | H04M 3/5191 379/265.09 |
| 2016/0188544 A1* | 6/2016 | Bastide | G06F 17/30864 715/205 |
| 2016/0283995 A1* | 9/2016 | Matula | G06Q 30/0613 |

\* cited by examiner

AGENT-INITIATED AUTOMATED CO-BROWSE

FIELD OF THE DISCLOSURE

The present disclosure is generally directed toward systems and methods for inserting machine-learned automated instructions into a human interaction.

BACKGROUND

Contact centers have determined over the last several years that collaborative browsing via an Internet connection or through the "cloud" (commonly known as co-browsing) is a useful tool. Customers may show a contact center agent, on the customer's browser, how the customer needs help. Co-browsing often includes browser assistance and one or more additional media types (e.g., email, telephone, chat, etc.).

Through co-browsing, a customer may provide a visual explanation of a situation, point or otherwise highlight certain graphical elements, and explain, such as via the additional media type, what is, or what should be, occurring. The agent may provide instructions for the customer to execute or, when authorized, provide the action directly to the customer's device. For example, graphical elements may be selected, inputs provided, text entered, or other actions initiated as required to assist the customer.

However, co-browsing has some limitations. Many co-browsing sessions include unnecessary conversation and lack of real-time updating, which can needlessly prolong the agent's interaction with the customer. Despite the many advantages of co-browsing, problems remain.

SUMMARY

It is with respect to the above issues and other problems that the embodiments presented herein were contemplated. Agents often duplicate portions of the co-browsing session that are common for all customers for certain transactions. By automating co-browsing subcomponents, human agents may be omitted or placed in an observing mode (and potentially able to address other issues) while an automated co-browsing session portion is executed. Performance may be improved in terms of network delay, such as when a human agent is more distant, from the customer compared to a server comprising automated instructions. Other improvements may be realized when instructions for an automated portion of a co-browsing session are delivered to a customer's client device during times when an interaction has low network utilization (e.g., greetings, on-hold, etc.). Once an appropriate point in a co-browsing session is reached, the downloaded instructions may execute and provide a portion of an interaction without any customer-observed delays, which may otherwise occur with a human-only interaction over a poor connection. A human agent may provide a portion of the interactions, or the selection of a particular automated interaction, while automated interactions provide other portions of the interactions. Automated interaction portions may be interspersed as needed within a co-browsing session.

In one embodiment, a co-browsing module is provided to analyze, learn, and model interactions found to be common to a number of successful agent/customer co-browse sessions. Based on the successful outcomes, the co-browsing module can provide and allow automated subcomponents and agent-handled live subcomponents within a single co-browse session. The agent may initiate a particular automated subcomponent, approve/disapprove suggested subcomponents, or in a more automated deployment, wait to be called in by an automated session to provide an agent-driven co-browse subcomponent.

A solution to provide co-browse discovery, detection, modeling, learning, and automation is provided. A co-browse module is operable to look at individual agent interactions as reinforced learning interactions to discover parts during co-browse interactions that can be automated. The co-browse module can look at user activity, agent activity, and the success or deviations from successful behaviors during co-browse interactions. This analysis can be used to create and provide an automation option as an agent tool within a co-browse interaction.

Automated systems may then learn from co-browse interactions and determine which subcomponents are automatable. The learning occurs through the monitoring of activity and the reinforcement of successful completion of the tasks as indicated by the agent's actions and/or lack of repeating portions of the interactions. Once subcomponents of interactions are learned, the subcomponents can be used to move in and out of automation during a co-browse interaction. The subcomponents may also be combined to form larger automatable components. The subcomponents can be fully automated and/or operated in an agent-assisted mode.

For example, a company deploys a new website that will allow interactive configuration of a new car. Once introduced, there are many requests for chat sessions received from customers, which in turn leads to co-browse interactions. After monitoring a number of these interactions, the co-browse module detects that the interior configurator co-browse interaction is a good candidate for automation as the interaction contains the same steps used to produce a successful outcome in all, or most, of the interactions. The co-browse module creates, provides, and offers an automated subcomponent to an agent when a customer arrives at the interior configuration portion of the interaction. When the agent chooses the automated subcomponent, the customer receives the automated co-browse subcomponent through the co-browse module's interior configurator. Once the customer has completed the subcomponent, the co-browse continues with the live agent during the exterior features and other portions of the interaction, as the activities during these subcomponents vary more widely from customer to customer.

In one embodiment, a server is disclosed, comprising: a communication interface configured to monitor a co-browsing session between a first agent endpoint and a first customer endpoint; a processor configured to receive the monitored co-browsing session; and upon the processor determining that the monitored co-browsing session will comprise a co-browsing session portion associated with an automated co-browsing session portion, the processor causes the automated co-browsing session portion to execute.

In another embodiment, a computer is disclosed comprising: a communication interface configured to monitor a co-browsing session between a first agent endpoint and a first customer endpoint; and a processor configured to receive the monitored co-browsing session, capture inputs provided by an agent associated with the first agent endpoint, and upon determining that a monitored co-browsing session portion is devoid of interaction failure indications, save the captured inputs as an automated co-browsing session portion.

In another embodiment, a method is disclosed, comprising: monitoring a the co-browsing session between a first agent endpoint and a first customer endpoint; and upon determining that the monitored co-browsing session will comprise a co-browsing session portion associated with an automated co-browsing session portion, executing the automated co-browsing session portion.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
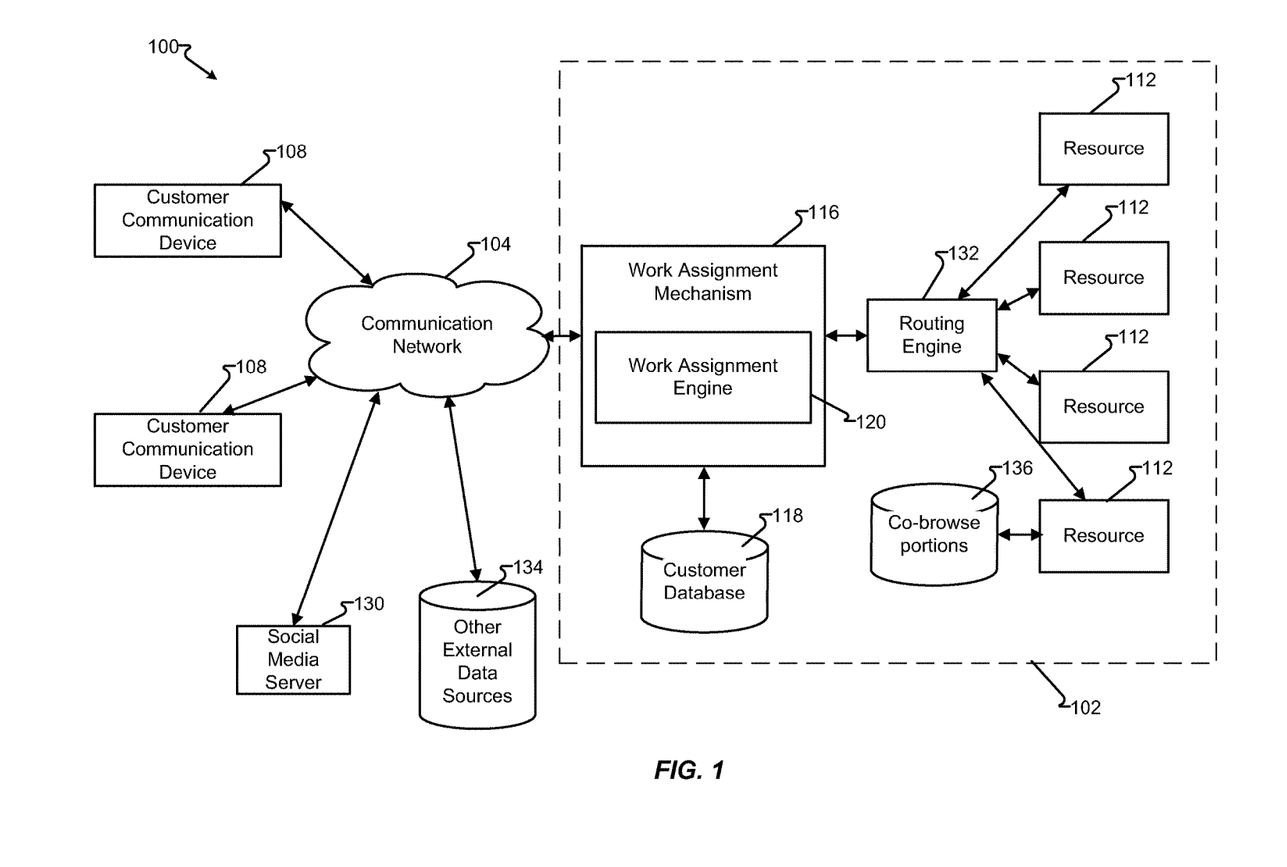
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 are distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other components may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically within contact center 102, such as when a customer utilizes customer communication device 108 at a kiosk attaches to a private network of contact center 102 (e.g., WiFi connection to a kiosk, etc.), within or controlled by contact center 102, and are still considered external to contact center 102.

It should be appreciated that the description of contact center 102 provides at least one embodiment whereby the following embodiments may be more readily understood without limiting such embodiments. Contact center 102 may further be altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources such as service bureaus and/or third-party data providers (e.g., credit agencies, public and/or private records, etc.). Customers may utilize their respective customer communication device 108 to send/receive communications utilizing social media website 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources located on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication at which point the work assignment mechanism 116 passes the work item to a routing engine 132 to connect the communication device 108, which initiated the communication, to the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

In another embodiment, resource 112 accesses co-browse portion database 136 comprising at least one automated co-browse portion instructions. Resource 112 and/or other component, may access the co-browse portion database 136 directly or via a network, such as communication network 104, and/or via another component. In one further embodiment, resource 112 may comprise a human agent utilizing a computer terminal (e.g., personal computer, tablet, smart phone, etc.) providing inputs, associated with instructions retrieved from co-browse portion database 136, as if the human agent had performed the input actions themselves with their own mouse, keyboard, etc. For example, inserting input signals into the driver and/or processor associated with human input devices. In another embodiment, resource 112 is a computer, such as a server, providing the inputs independently of the inputs provided upon a computer resource 112 associated with the human agent. For example, it may appear to the customer that the agent is moving their mouse, typing on their keyboard, etc., although such inputs are being provided by a server or other computer resource 112. The computer resource 112 associated with the human agent may be presented with an indication as to what is occurring; however, the human agent may be merely an observer or temporarily able to tend to other tasks.

Figure 2:
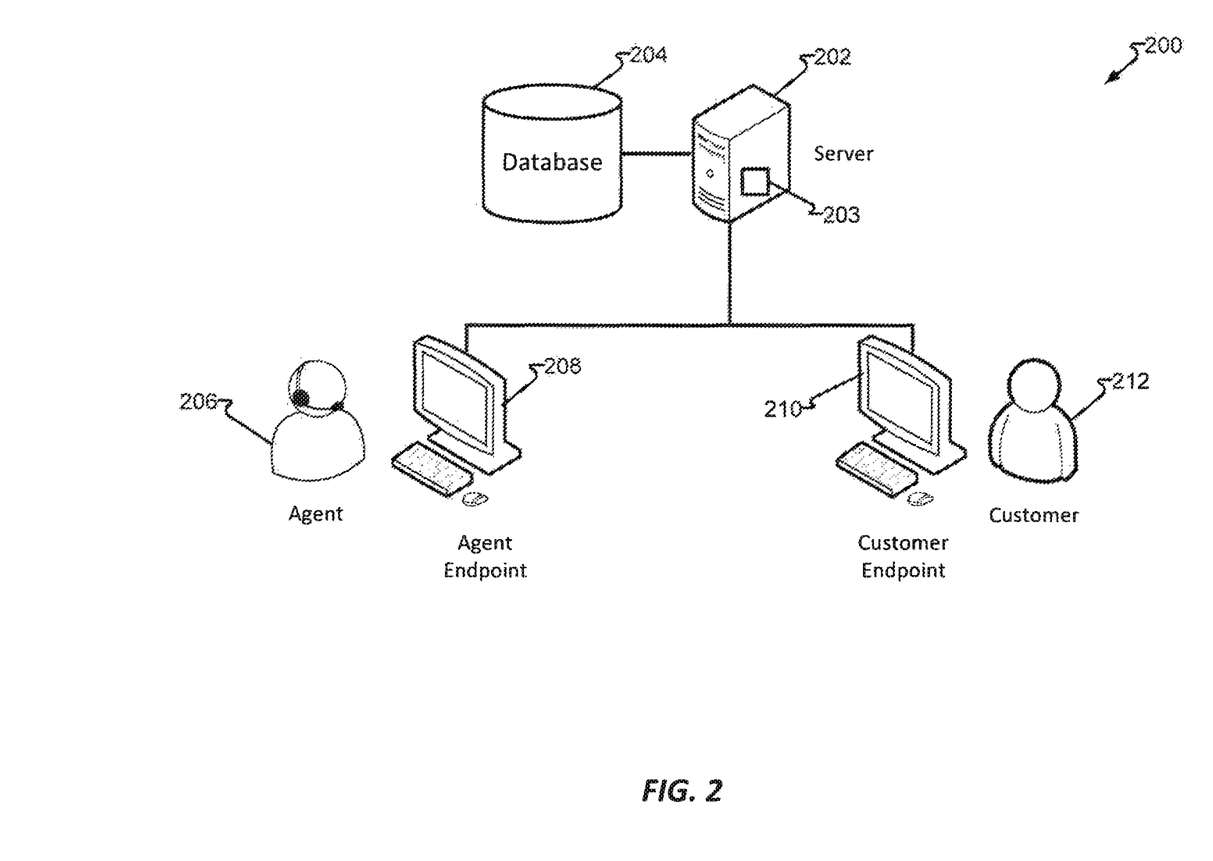
FIG. 2 depicts a second system in accordance with embodiments of the present disclosure.

FIG. 2 depicts system 200 in accordance with embodiments of the present disclosure. In one embodiment, system 200 is a representation of certain components provided with respect to system 100 (See FIG. 1). In another embodiment, system 100 may be provided by components of system 200. In other embodiments, server 202 may comprise, be comprised by, and/or be co-located with one or more of work assignment mechanism 116, work assignment engine 120, routing engine 132, and/or one or more resources 112. In yet another embodiment, server 202, and/or database 204 may comprise, be comprised by, or be co-located with agent endpoint 208.

In one embodiment, resource 112 is embodied by human agent 206 and agent endpoint 208 in communication with customer 212 utilizing one of customer communication device 108 configured with co-browsing capability, herein customer endpoint 210. Server 202, comprising communication interface 203 receives and monitors and optionally facilitates the communication exchange between agent endpoint 208 and customer endpoint 210. In one embodiment, database 204 comprises a list of indicators associated with automated co-browsing segments.

As the exchange between agent 206 and customer 212 is underway utilizing agent endpoint 208 and customer endpoint 210, server 202 monitors the exchange and determines if an indicator has been detected associated with at least one indicator in database 204. The exchange between agent endpoint 208 and customer endpoint 210 may comprise audio, video, and/or text, in addition to a co-browsing channel. Server 202 may then monitor an existing co-browsing session, having inputs provided by agent 206 upon agent endpoint 208, four indicators of automated co-browsing segments. In another embodiment, server 202 may detect the presence of the indicators based upon text, speech, and/or other communication channel content.

For example, customer 212 and agent 206 may be engaged in a voice-only exchange monitored by server 202. Server 202 determines an indicator is present in the exchange (e.g., "I can't find my flight information.") associated with an automated co-browsing segment. If agent endpoint 208 and customer endpoint 210 are presently not engaged in any co-browsing activity, server 202 may prompt agent 206 and/or customer 212 to initiate co-browsing. Having established co-browsing between agent endpoint 208 and customer endpoint 210, server 202 may cause an automated co-browsing segment to be retrieved from database 204 and executed, such as to assist the customer in finding their flight information. The location of the process or processor's executing the automated co-browsing segment instructions is variously embodied and discussed more fully with respect to FIGS. 3A-3C.

The execution of the automated co-browsing segment instructions provides inputs, which when observed by customer endpoint 210, appear to be inputs provided by agent 206. For example, the typing of text, the selecting of checkboxes and/or radio buttons, and/or other inputs is the result of the execution of the instructions during which time agent 206 may be idle or performing other tasks, such as observing the interaction between customer endpoint 210 and the automated co-browsing segment instructions. The instructions may optionally include user prompts to gather certain information. For example, the location of flight information for customer 212 may require entry of an account number or other personal information. The instructions may solicit customer 212 to provide the information into an interface presided by customer endpoint 210, which may be further associated with a co-browsing activity, or entered into a separate dialogue or via other input means. As a further example, server 202 may comprise other automated portions such as prerecorded messages, such as agent 206 speaking the words, "what is your account number?" or "type your account number here," while the automated co-browsing segment highlights or indicates a portion of a front-end application (e.g., form, website, etc.) or portion thereof where the account number should be entered.

Once the automated co-browsing segment has reached its conclusion, server 202 may notify agent 206, such as by a message on agent endpoint 208, indicating co-browsing activity has terminated and/or should be resumed by agent 206. A co-browsing interaction between agent endpoint 208 and customer endpoint 210 may comprise a number of automated co-browsing segments in series and/or interspersed with manual co-browsing segments provided by agent 206. In another embodiment, server 202 may monitor the exchange between agent endpoint 208 and customer endpoint 210 to determine co-browsing activities that are successful and are not successful and may be further provided by either an automated co-browsing instruction or agent 206. For example, if server 202 determines an issue was not resolved as expected, such as by determining certain activities have been revisited, undone, and/or redone by spoken or textually inputted indicators of dissatisfaction provided by customer 212 (e.g., "No, I've already tried that," "That's not what I mean," etc.).

In another embodiment, automated co-browsing instructions are derived based upon prior agent-based co-browsing interactions. One or more agents, such as agent 206, may interact with a customer 212 to resolve a particular issue. Server 202 may monitor the co-browsing activity between agent endpoint 208 and customer endpoint 210 to determine certain commonalities. For example, if customer 212 is inquiring about obtaining a receipt for a prior flight and agent 206 launches a co-browsing session whereby the mouse pointer is used to select a certain graphical element (e.g., "my account," etc.) whereby the session comprises indicators of success (e.g., "thank you," "that helps," etc.), server 202 may then automatically generate an automated co-browsing instruction whereby the graphical element is selected in response to similar future customer inquiries.

Database 204 may then create a record indicating indicia of prior flights that may be resolved, at least in part, by launching automated co-browsing instructions that comprise, in part, selecting the "my account" graphical element. Server 202 may also automatically determine the need for customer 212 to provide certain information. For example, it may be observed that when prompted for an account number no account number received is the same and, therefore, future customer inquiries may comprise a prompt for an account number.

As can be appreciated, the threshold of successful prior interactions of human agents may be determined with respect to certain thresholds. For example, if all human agents resolve a particular issue successfully, automated co-browsing instructions mimicking such human agent actions may be provided as automated co-browsing instructions to future interactions. However, as a matter of design choice the threshold may be lower than absolute or one hundred percent success. Server 202 may utilize past failures and look for commonality with those failing interactions, such that when detected in a future playback of the automated co-browsing instructions agent 206 is alerted of a possible failure.

The learning of agent behaviors to determine an automated co-browsing instruction may be iterative and/or manually edited. For example, a change in the layout of a particular webpage may cause one or more automated co-browsing instructions to become inoperable. An agent may be asked to approve or validate the instructions as still operational for a modified webpage. If necessary, manual modification of the instructions associated with automated co-browsing instructions may return operability. In another embodiment, a modified webpage may be flagged as requiring retraining. Retraining may discard the prior instructions and derive new automated co-browsing instructions from monitored human agent co-browsing operations. However, it certain embodiments, one or more agent co-browsing session may be determined to be similar to the existing automated co-browsing instructions and, therefore, cause the automated co-browsing instructions to be validated against the modified web page. Similarity may be provided in terms of a threshold of differences between co-browsing interactions before and after the modification to the web page. If sufficiently similar, the existing co-browsing instructions may be continued with the modified webpage. Additionally, the beginning and/or ending boundaries of the automated co-browsing instructions may be changed. For example, a modified webpage may cause an existing automated co-browsing instruction to end, that is to continue back to the agent, at an earlier point in the instructions.

Alternatively, if the modified webpage is no longer operational with existing automated co-browsing instructions, retraining may then create new instructions to accommodate the modified webpage. As a further option, automated co-browsing instructions having a failure rate above a previously determined threshold may be discontinued and agent 206 may then be notified to monitor the automated co-browsing instructions more closely, cause the automated co-browsing instructions are de-prioritized in favor of more successful automated co-browsing instructions, or discontinue automated co-browsing until new instructions may be derived from future manual co-browsing operations.

Figure 3A:
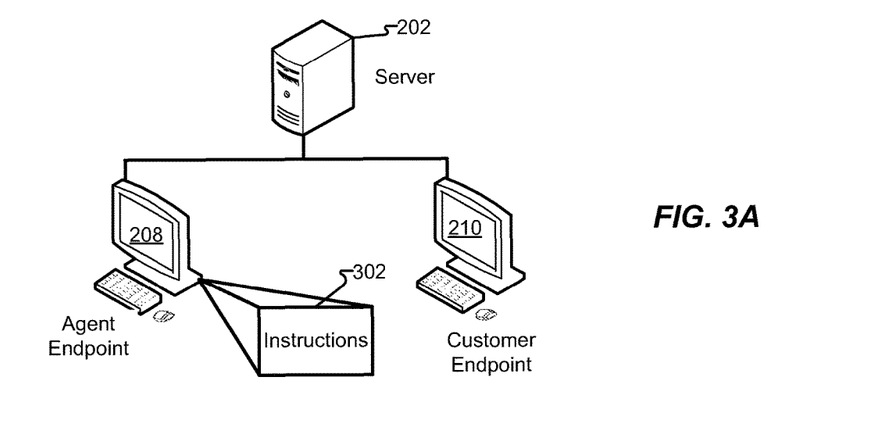
FIG. 3A depicts the second system in a first configuration in accordance with embodiments of the present disclosure.
Figure 3B:
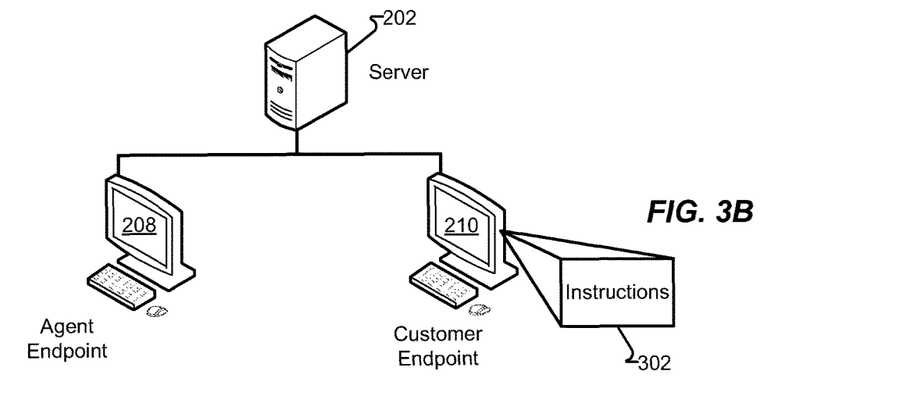
FIG. 3B depicts the second system in a second configuration in accordance with embodiments of the present disclosure.
Figure 3C:
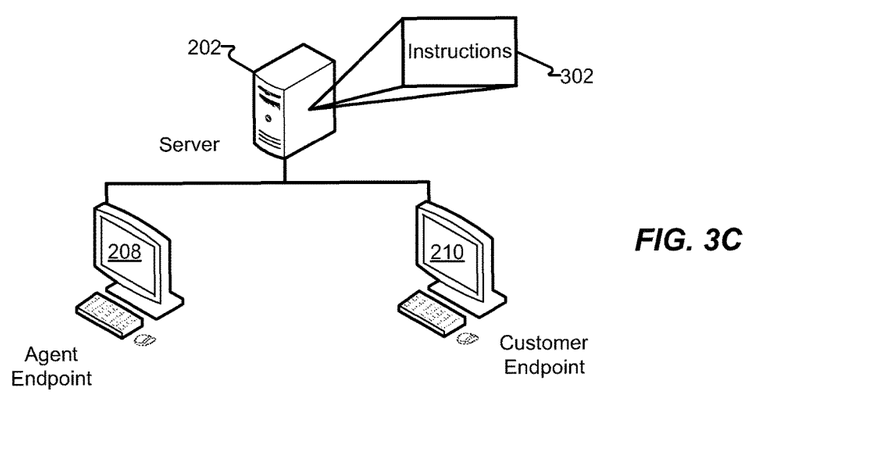
FIG. 3C depicts the second system in a third configuration in accordance with embodiments of the present disclosure.

FIGS. 3A-3C depict a system, such as system 200, differing in the location points of execution for co-browsing segment instructions. It should be appreciated that the location indicated refers to a processor or processors associated with an indicated computing appliance. FIG. 3A depicts system 200 in a first configuration in accordance with embodiments of the present disclosure. Instructions 302, comprising one or more instruction, are executed by agent endpoint 208. In one embodiment instructions 302 provide keyboard, mouse, and/or other input device driver inputs utilized by components of agent endpoint 208. In another embodiment, instructions 302 are provided to a co-browsing application interface to mimic the inputs received by such an application and are conveyed to customer endpoint 210.

FIG. 3B depicts system 200 in a second configuration in accordance with embodiments of the present disclosure. In one embodiment, co-browsing instructions 302 are provided to customer endpoint 210 and executed thereon. Customer endpoint 210 perceives these inputs as originating from agent input 208. In another embodiment, customer endpoint 210 may be preloaded with one or more co-browsing segment instructions, such as during times of low data communication utilization. For example, agent 206 utilizing agent endpoint 208 may be speaking with customer 212 utilizing customer endpoint 210 while one or more co-browsing segment instructions are downloaded to customer endpoint 210. Upon server 202 detecting an opportunity to utilize at least one of the co-browsing instructions, the co-browsing instructions utilized are already present and readily selected for the execution of the instructions therein.

FIG. 3C depicts system 200 in a third configuration in accordance with embodiments of the present disclosure. Instructions 302 are executed by server 202, such as after being retrieved from a memory location and/or database 204 (see FIG. 2). The execution of instructions 302 by server 202 may be provided solely to customer endpoint 210 or optionally customer endpoint 210 and agent endpoint 208. The determination of whether to present indicia of the executing instructions on agent endpoint 208 may be determined by the operator of agent endpoint 208, such as agent 206. For example, agent 206 may wish to attend to a different task while automated co-browsing segment instructions 302 is underway and, therefore, not receive indicia of instructions 302, receive indications of the progress of instructions 302, receive only an indication of the conclusion of instructions 302, or other display modification as a matter of design choice.

Figure 4:
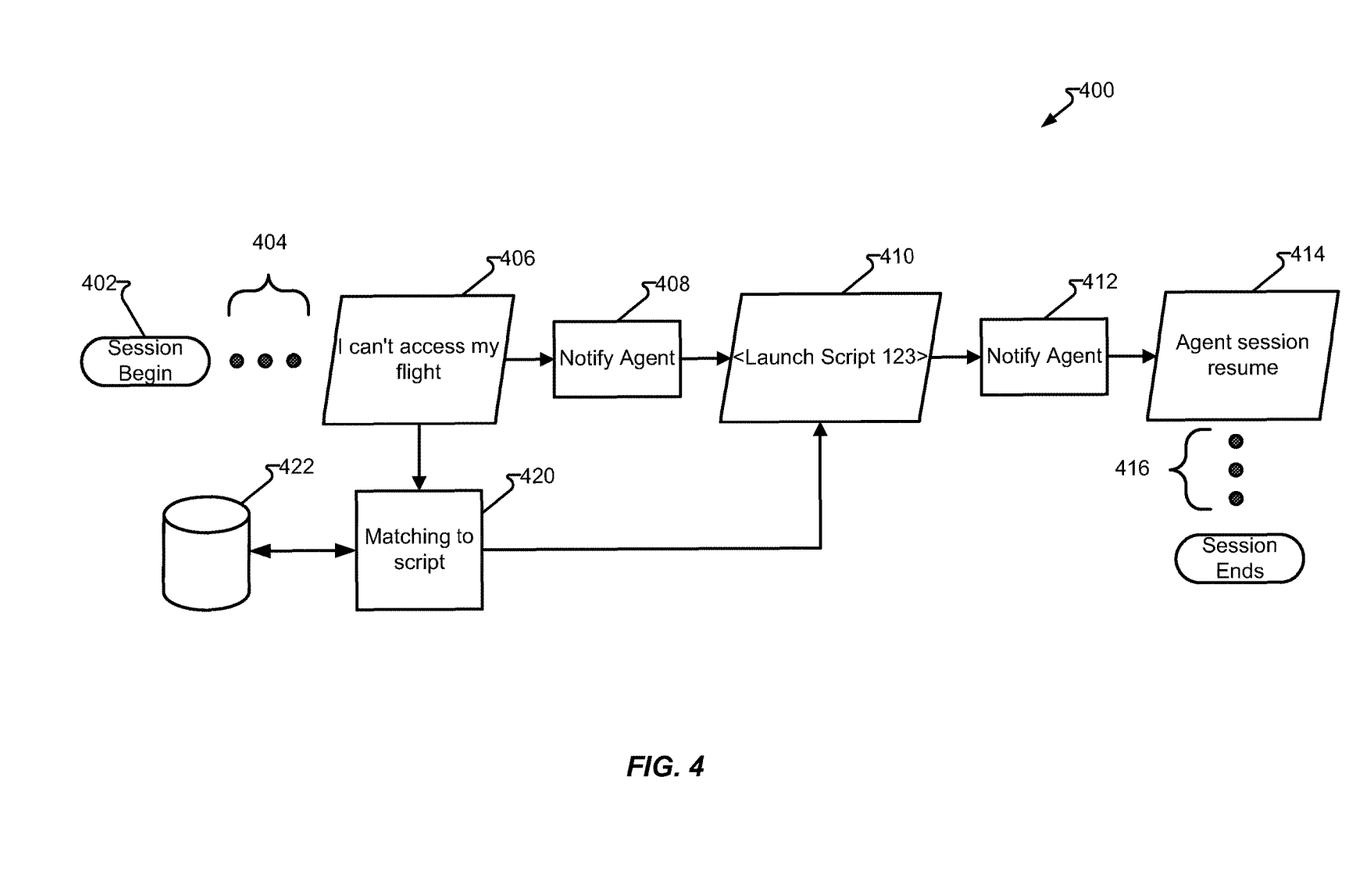
FIG. 4 depicts a co-browsing session in accordance with embodiments of the present disclosure.

FIG. 4 depicts co-browsing session 400 in accordance with embodiments of the present disclosure. In one embodiment, session 400 comprises an interaction between a customer, such as customer 212 utilizing customer endpoint 210, and one or more resources 112, such as human agent 206 utilizing agent endpoint 208 and server 202. Session 400 begins 402 such as by customer 212 placing a call to contact center 102. The call may initially be voice only, however prior to launching a co-browsing portion, customer 212 is prompted to launch a co-browsing client application or otherwise authorize and enable co-browsing.

Session 400 may comprise additional introductory components 404, such as authenticating the user, gathering initial information, creating a work item, enqueuing a work item, routing the work item to a selected agent, etc. Interaction portion 406 comprises an indication associated with an automated co-browsing portion. Logic block 420 determines the automated co-browsing portion is available such as within database 422. Interaction portion 408 notifies the agent of the automated co-browsing portion and, optionally, requests approval from the agent to launch the selected automated co-browsing portion. Interaction portion 406 may optionally be launched manually, such as by agent 206 selecting an indicia associated with a particular automated co-browsing portion. Automated co-browsing instructions 410 is then launched to provide the automated co-browsing portion. Automated co-browsing instructions 410 may comprise, or be associated with, non-co-browsing instructions. For example, during a particular portion of automated co-browsing instructions 410, agent 206 may be prompted to say, "I need to disable your firewall for this next step," or otherwise convey information to customer 212. Such messages may be provided as a conditional (e.g., "May I proceed?") and require customer 212 to provide a certain action; if permission is withheld, the automated co-browsing instructions 410 may terminate. Automated co-browsing instructions 410 may also comprise informational messages, (e.g., "Now I'm going to access your history file . . . "). As a further option, such information may be provided directly to customer endpoint 210 with or without notification to agent 206.

Upon completion of automated co-browsing instructions 410, notification 412 is provided to the agent 206 such as to alert the agent 206 to resume manual co-browsing activities or otherwise reengage in the interaction session 414. Additional components 416 are provided as needed until the interaction has concluded.

Figure 5:
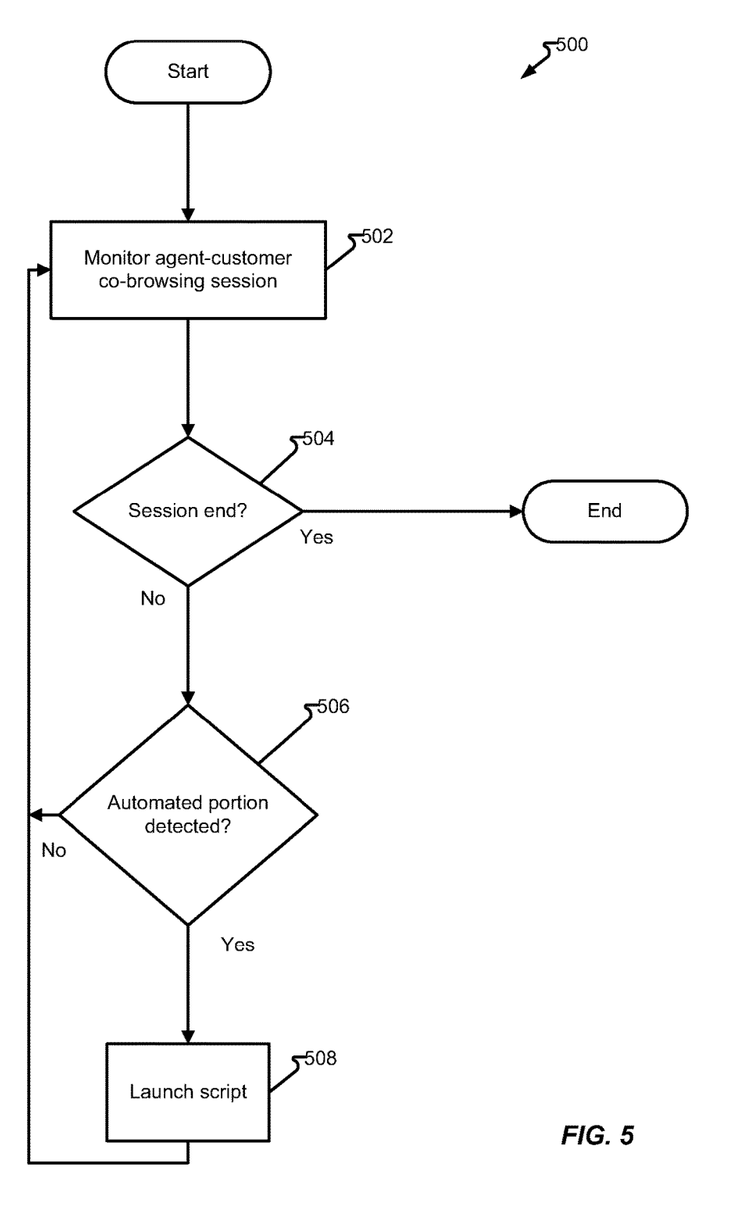
FIG. 5 depicts a process in accordance with embodiments of the present disclosure.

FIG. 5 depicts process 500 in accordance with embodiments of the present disclosure. In one embodiment, process 500 begins at step 502 were monitored agent customer co-browsing session is in progress. As an option, the co-browsing session, if not already initiated, may be started, such as by providing a customer 212 with instructions on launching a co-browsing application. Step 504 determines if the session has concluded and, if so, process 500 ends; otherwise, processing continues to step 506. Step 506 determines if an automated portion is detected for an upcoming co-browsing session portion. For example, server 202 may monitor and exchange between agent endpoint 208 and customer endpoint 210 and determine that database 204 contains automated co-browsing instructions to provide at least a portion of the co-browsing interaction therebetween.

If step 506 is determined in the affirmative, processing continues to step 508 whereby a script is launched or otherwise the automated co-browsing instructions are provided to at least customer endpoint 210. Upon completion of step 508, processing continues back to step 502 to determine if a subsequent automated co-browsing portion may be forthcoming in a subsequent iteration of step 506. Process 500 continues until such time as step 504 determines the session has concluded whereby process 500 determines.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A server, comprising:
    a communication interface receiving a co-browsing session between a first agent endpoint and a first customer endpoint;
    a processor monitoring the receive co-browsing session; and
    upon the processor determining that the monitored co-browsing session will comprise a co-browsing session portion associated with an automated co-browsing session portion, the processor causes the automated co-browsing session portion to execute.

2. The server of claim 1, wherein the processor is further configured to cause the automated co-browsing session portion to execute the automated co-browsing session portion on the first customer endpoint.

3. The server of claim 1, wherein the processor is further configured to cause the automated co-browsing session portion to execute the automated co-browsing session portion on the first agent endpoint.

4. The server of claim 1, wherein the processor is configured to cause the first agent endpoint to issue an alert upon completion of the execution of the automated co-browsing session portion.

5. The server of claim 1, wherein the processor is further configured to cause the first agent endpoint to present a notification operable to alert an agent associated with the first agent endpoint and delay execution of the automated co-browsing session portion until a signal is received from the agent associated with the first agent endpoint authorizing the execution of the automated co-browsing session portion.

6. The server of claim 1, wherein the automated co-browsing session portion comprises at least one of a pointer device movement, a pointer device click, and a keyboard entry that mimics co-browsing session inputs provided by a human agent associated with the first agent endpoint.

7. The server of claim 1, wherein the automated co-browsing session portion comprises a message presented upon the first agent endpoint operable to prompt an agent associated with the first agent endpoint to provide speech to the first customer over a voice channel associated with the message.

8. The server of claim 1, wherein the processer is further configured to monitor a co-browsing session between a second agent endpoint and a second customer endpoint, capture inputs provided by an agent associated with the second agent endpoint, and upon determining that a common portion of the monitored co-browsing session between the second agent endpoint and the second customer endpoint is devoid of interaction failure indications, save the captured inputs as the automated co-browsing session portion.

9. The server of claim 1, wherein:
    the processor is further configured to monitor a plurality of the co-browsing sessions between a plurality of second agent endpoints and a plurality of second customer endpoints; and
    the processor is further configured to capture of a plurality of inputs provided by the plurality of agents associated with the plurality of second agent endpoints, and upon determining that the co-browsing sessions are devoid of interaction failure indications, saving an aggregation of the captured plurality of inputs as the automated co-browsing session portion.

10. The server of claim 1, wherein the processor is further configured to receive editing inputs to edit the automated co-browsing session portion and save the edited automated co-browsing session portion as the automated co-browsing session portion.

11. A computer comprising:
    a communication interface receiving a co-browsing session between a first agent endpoint and a first customer endpoint; and a processor monitoring the received co-browsing session, capture inputs provided by an agent associated with the first agent endpoint, and upon determining that a monitored co-browsing session portion is devoid of interaction failure indications, save the captured inputs as an automated co-browsing session portion.

12. The computer of claim 11, further comprising:
wherein the co-browsing session between the first agent endpoint and the first customer endpoint, further comprises a plurality of co-browsing sessions between a plurality of first agent endpoints and a plurality of first customer endpoints; and
the processor is further configured to capture inputs provided by the plurality of agents associated with the plurality of first agent endpoints, and upon determining that a common portion of the plurality of co-browsing sessions is devoid of interaction failure indications beyond a previously determined threshold, save an aggregation of the captured inputs of the common portion of the plurality of monitor co-browsing sessions as the automated co-browsing session portion.

13. The computer of claim 11, further comprising:
a communication interface configured to monitor the co-browsing session between a second agent endpoint and a second customer endpoint;
the processor further configured to receive the co-browsing session, determine that the co-browsing session will comprise a co-browsing session portion associated with the automated co-browsing session portion, execute the automated co-browsing session portion.

14. The computer of claim 13, wherein the processor is further configured to signal an agent to authorize the execution of the automated co-browsing session and delay execution of the automated co-browsing session until authorization has been indicated.

15. A method, comprising:
monitoring, by a processor, a co-browsing session between a first agent endpoint and a first customer endpoint; and
upon determining that the monitored co-browsing session will comprise a co-browsing session portion associated with an automated co-browsing session portion, causing by the processor the automated co-browsing session portion to execute.

16. The method of claim 15, wherein executing the automated co-browsing session portion further comprises causing the first agent endpoint to execute the automated co-browsing session portion.

17. The method of claim 15, further comprising:
causing, by the processor, an alert to be presented upon the first agent endpoint indicating the determination of the monitored co-browsing session will comprise a co-browsing session portion associated with the automated co-browsing session portion;
prompting, by the processor, an agent associated with the first agent endpoint indicating the automated co-browsing session portion; and
upon receiving an authorization input from the agent, causing by the processor the automated co-browsing session portion to execute.

18. The method of claim 15, further comprising, causing by the processor an alert to be presented upon the first agent endpoint indicating completion of the execution of the automated co-browsing session portion.

19. The method of claim 15, further comprising:
monitoring, by the processor, the co-browsing session between a second agent endpoint and a second customer endpoint;
capturing, by the processor, inputs provided by an agent associated with the second agent endpoint;
determining, by the processor, that a monitored co-browsing session portion is devoid of interaction failure indications; and
saving the captured inputs as the automated co-browsing session portion.

20. The method of claim 15, further comprising:
monitoring, by the processor, a plurality of co-browsing sessions between a plurality of second agent endpoints and a plurality of second customer endpoints;
capturing, by the processor, a plurality of inputs provided by the plurality of agents associated with the plurality of second agent endpoints;
determining, by the processor, that a common portion of the plurality of co-browsing sessions are devoid of interaction failure indications; and
causing, by the processor, an aggregation of the captured plurality of inputs as the automated co-browsing session portion to be saved in a data storage.

* * * * *